United States Patent [19]

Ladeira et al.

[11] Patent Number: 4,649,033

[45] Date of Patent: Mar. 10, 1987

[54] PROCESS TO ELIMINATE AIR POLLUTANTS WHICH RESULT FROM THE COMBUSTION OF FUELS CONTAINING SULPHUR

[75] Inventors: Newton C. Ladeira; Paulo R. M. De Oliveria; Adilson P. Marante; Pedro A. Krepel, all of Sao Paulo, Brazil

[73] Assignee: K,L+M Industria E Comercio S/P, Brazil

[21] Appl. No.: 610,998

[22] PCT Filed: Aug. 25, 1983

[86] PCT No.: PCT/BR83/00007

§ 371 Date: Apr. 20, 1984

§ 102(e) Date: Apr. 20, 1984

[87] PCT Pub. No.: WO84/00903

PCT Pub. Date: Mar. 15, 1984

[30] Foreign Application Priority Data

Aug. 26, 1982 [BR] Brazil ................................. 8205030
Aug. 16, 1983 [BR] Brazil ................................. 8304413

[51] Int. Cl.$^4$ ............................................. C01B 17/00
[52] U.S. Cl. .............................. 423/242; 423/512 A; 423/545
[58] Field of Search .......... 423/242 A, 244 R, 244 A, 423/242 R, 545, 512 A

[56] References Cited

U.S. PATENT DOCUMENTS

| | | | |
|---|---|---|---|
| 3,508,868 | 4/1970 | Kiyoura | 423/545 |
| 3,523,407 | 8/1980 | Humbert | 423/242 |
| 3,709,977 | 1/1973 | Villiers-Fisher | 423/244 |
| 3,928,536 | 12/1975 | Lewis | 423/242 |
| 4,064,219 | 12/1977 | Yamashita | 423/242 |

FOREIGN PATENT DOCUMENTS

| | | | |
|---|---|---|---|
| 1388690 | 2/1965 | France. | |
| 2364682 | 4/1978 | France. | |
| 2382263 | 9/1978 | France. | |
| 826221 | 12/1959 | United Kingdom | 423/242 |
| 1104583 | 2/1968 | United Kingdom. | |
| 2004259 | 3/1979 | United Kingdom. | |

OTHER PUBLICATIONS

Chemical Abstracts, vol. 95, No. 12, Sep. 1981, 102276y.

*Primary Examiner*—Gregory A. Heller
*Attorney, Agent, or Firm*—Darby & Darby

[57] ABSTRACT

Process to eliminate air pollutants which result from the combustion of fuels containing sulphur, permitting the transformation of substantially all the existing $SO_2$ and $SO_3$ produced by the combustion of fuels to ammonium sulphate.

8 Claims, 3 Drawing Figures

PROCESS TO ELIMINATE AIR POLLUTANTS WHICH RESULT FROM THE COMBUSTION OF FUELS CONTAINING SULPHUR

TECHNICAL FIELD

The present invention refers to a process aimed at the elimination of air pollution caused by the burning of Sulphur containing fuels in all kinds of industry and equipment of all sizes. The process requires less investment than other alternative processes and produces a commercial end-product.

BACKGROUND ART

One of today's main concerns has been to eliminate air polluting agents resulting from the burning of Sulphur containing fuels, without generating inadequate by-products. Many of the processes presently used require large investments in equipments and installations, normally without return or with high added operational costs.

DISCLOSURE OF INVENTION

Aiming at solving or minimizing these problems, this process has been developped. Basicaly simple, easily retrofitted into the polluting equipments, with low investment costs, this process produces a high value end-product. Specifically, the aim of this invention is to transform all Sulphur Dioxide ($SO_2$) and Sulphur Trioxide ($SO_3$) existing in the combustion gases, to Ammonium Sulphate. This is obtained through the reaction of $SO_3$ and $SO_2$ with Ammonia, preferably in gaseous state, which is injected directly into the combustion gases. The collected stable end-product is Ammonium Sulphate [$(NH_4)_2SO_4$] which is separated from the flue gases.

These and other objectives of this invention are obtained by this process which comprises the following steps: undertake at least one injection of Ammonia ($NH_3$) in the combustion gases at temperatures between 250° C. and 600° C., in quantity sufficient to react with all the $SO_3$ which is present and with part of the existing $SO_2$; cool the gases to a temperature lower than about 65° C.; separate the submicron and micron size particles from the combustion gases; collect the $(NH_4)_2SO_4$ from the separating equipment, and send the desulphurized combustion gases to the flue.

Considering the possibility of providing more then one injection point of Ammonia ($NH_3$), this process has foreseer the division of the injection into: a first injection of gaseous $NH_3$ (Ammonia) into the 250° C. to 600° C. combustion gases and in a quantity sufficient to react with all the present $SO_3$, and a second injection of gaseous $NH_3$ at a region where the combustion gases are at a 65° C. to 250° C. temperature range and in a quantity sufficient to react with at least a part of the existing $SO_2$.

In this case, the first injection is directed mainly the neutralization of the $SO_3$.

In case of injection of all the Ammonia ($NH_3$) in the 250° C. to 600° C. combustion gases temperature range, the $NH_3$ will react with all present $SO_3$ and the rest of $NH_3$ will intermix with the combustion gases stream, up to the point where the temperature permits the occurence of an irreversible reaction between the $SO_2$ and $NH_3$.

As already established technically, the $SO_3$ is a gas formed during the combustion of Sulphur containing fuels, by the reaction of gaseous $SO_2$ with molecular Oxygen ($O_2$), by the reaction of $SO_2$ in the flame with atomic Oxygen and by catalytic oxidation of $SO_2$ in the heat transfer surfaces under high temperatures. The corresponding reactions are the following:

$$S + O_2 \rightarrow SO_2$$

$$2SO_2 + O_2 \rightarrow 2SO_3$$

$$S + 3(O) \rightarrow SO_3$$

Without the presence of catalysers, the burning of Sulphur containing fuels results in up to 5% $SO_3$ in the total of $SO_x$ compounds. In spite of the fact that gaseous Ammonia reacts with $SO_3$ in the temperature range of 250° C. to about 600° C., it has been verified that the ideal temperature range is 300° C. to 400° C. In this range, the reation of $SO_3$ with $NH_3$ is instantaneous resulting in $(NH_4)_2SO_4$ (Ammonia Sulphate) and eliminating the possibility of corrosion in the surfaces which would have been contacted by the $SO_3$. This corrosion occurs due to the formation of liquid Sulphuric Acid ($H_2SO_4$) when $SO_3$ and water of combustion ($H_2O$) combine at temperatures below the Sulphuric Acid dew point. The quantity of injected $NH_3$ is sufficient to insure the formation of $(NH_4)_2SO_4$ (Ammonium Sulphate).

Smaller quantities of $NH_3$ would result in the formation of Hydrogen Ammonium Sulphate ($NH_4HSO_4$), which is a corrosive compound. The corresponding reactions are the following:

$$2NH_3 + H_2O + SO_3 \rightarrow (NH_4)_2SO_4$$

$$NH_3 + H_2O + SO_3 \rightarrow NH_4HSO_4$$

The minimum calculated quantity of $NH_3$ to avoid formation of $NH_4HSO_4$ in 3% Sulphur bearing fuel oils, for example, is 0.08% of the oil weight. For higher levels of Sulphur, the percentage will correspondingly higher (up to 9%). The reaction product $(NH_4)_2SO_4$ is stable and is carried together with the combustion gases' stream. As previously mentioned, this process is directed towards a complete and reliable elimination of the $SO_2$ resulting from the combustion of liquid, solid or gaseous fuels.

To neutralize the $SO_2$, the gaseous $NH_3$ is injected in one or more locations of the equipment, where the combustion gases are at a range of 65° C. to 600° C. If the gaseous $NH_3$ is totally injected in a 200° C. to 600° C. region, the excess portion which does not participate in the reaction with $SO_3$, is carried in the combustion gases' stream, forming an intimate mixture which will react when the right temperature range is reached.

At 120° C. the quantities of $SO_2$ which react with $NH_3$ increases, and as the temperature of the gases decreases to about 108° C., an equilibrium situation is reached with 35% to 40% of the existing $SO_2$ having reacted with $NH_3$ according to the following reversible reations:

$$NH_3 + H_2O + SO_2 \rightleftharpoons (NH_4)HSO_3 \text{ Ammonium Hydrogen Sulphite}$$

$$(NH_4)HSO_3 + NH_3 \rightleftharpoons (NH_4)_2SO_3 \text{ Ammonium Sulphite}$$

$$(NH_4)_2SO_3 \rightleftharpoons 2NH_3 + H_2O + SO_2$$

It has been experimentaly verified that this equilibrium situation is maintained until temperatures in the range of 65° C. are attained.

Between 65° C. and 48° C. it has been experimentaly proven that this reaction is stable with the simultaneous oxidation of Ammonium Sulphite to Ammonium Sulphate according to the following reactions:

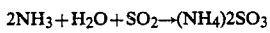

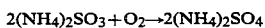

This oxidation is processed by existing combustion air in excess or by an extra air antrainment into the gases, just before the separation system. The $(NH_4)_2SO_4$ (Ammonium Sulphate) is a stable, solid, submicron to a low value micra sized, product.

The above mentionned facts lead to verified results, if the combustion gases are released at higher temperatures then 65° C., part of the $SO_2$ (even if already reacted) might be released to the atmosphere, due to the reversible nature of the reactions at that higher range.

The separation of the stable end-product $(NH_4)_2SO_4$ (Ammonium Sulphate) from the combustion gases' stream, can be accomplished by dry methods such as Electrostatic Precipitators or other kinds of filters, or more economically by wet processes such as water absorbers.

The absorption of $(NH_4)_2SO_4$ (Ammonium Sulphate) in water is possible due to the highly soluble nature of this product.

DESCRIPTION OF THE DRAWINGS

The process will now be briefly outlined so as to show an example of a feasible and tested lay-out of the Desulphurization of Combustion Gases with Ammonia.

FIG. no. 1 represents a flow diagram of the main components of an installation comprising the equipment where the Sulphur bearing fuel is burned, two distinct Ammonia injection points, the $(NH_4)_2SO_4$ wet absorption system, an entrained water separator, the desulphurized flue gases released to atmosphere and the concentrated Ammonium Sulphate solution collection system.

FIG. no. 2 illustrates one of the several assemblies of the Ammonia injection elements, in adequate locations of the combustion gases' stream.

FIG. no. 3 shows a typical configuration of the $NH_3$ injection tubes.

BEST MODE OF CARRYING OUT THE INVENTION

Figure 1:
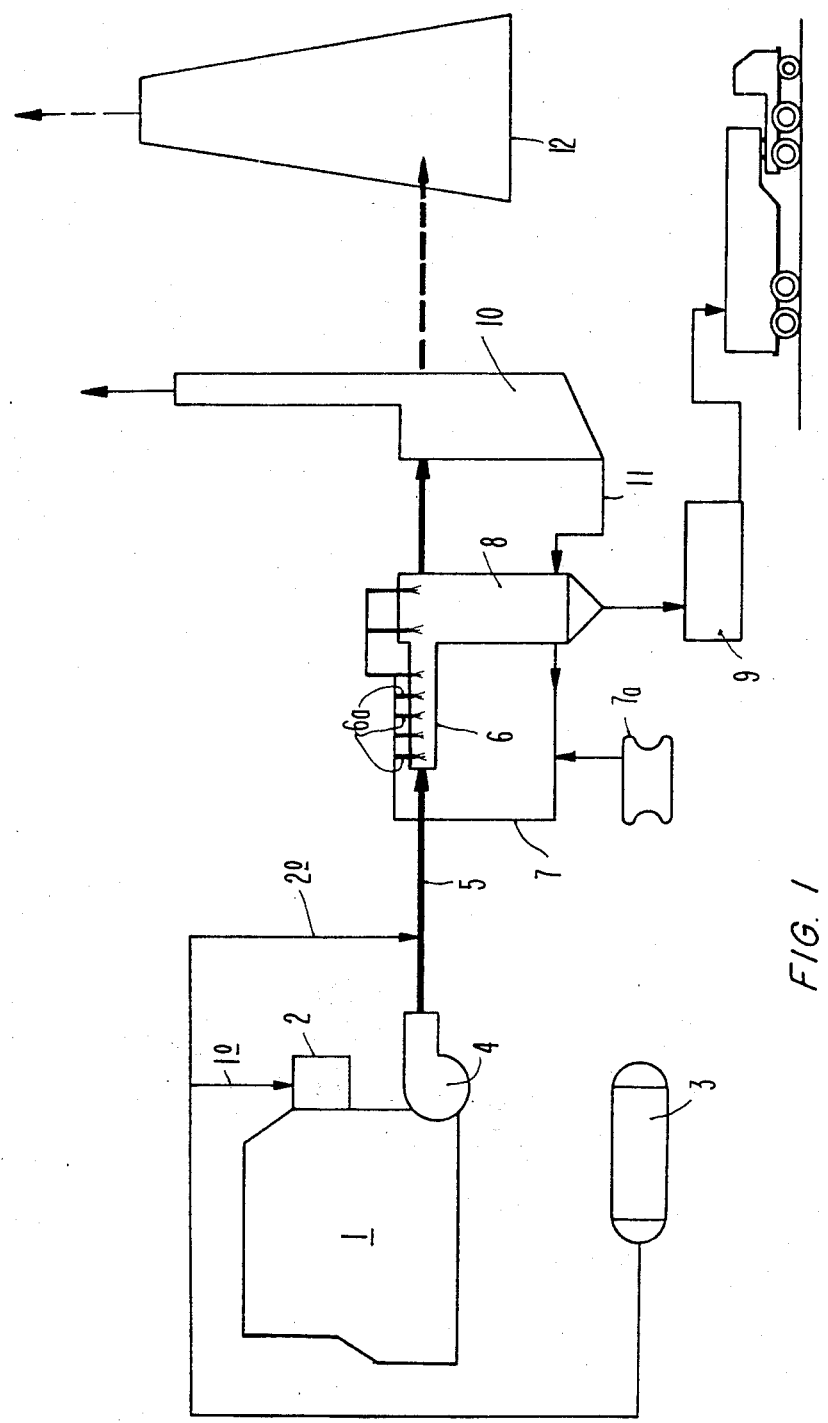

As shown in FIG. 1, this process is applied in industrial installations such as boilers, furnaces, ovens, dryers, etc (1), burning Sulphur bearing fuels. Heat recovery equipment (2) may or not be present. In the present process, $NH_3$ coming from a storage tank (3) is distributed in gaseous or liquid form. If as a liquid, $NH_3$ is vaporised or not and injected initialy in a region where the gases are preferably between 250° C. and 600° C. and before the heat recovery equipment. The quantity of the first injection is, as previously explained, adequate to insure complete reaction with the $SO_3$, therefore eliminating corrosion problems in the heat recovery or other metallic or non metallic components of the existing installation. This permits the use of cheaper construction materials or results in longer life of the existing ones.

The combustion gases which leave the heat recovery equipment (2) in the example shown, are conducted by means of a duct (5) and ventilator (4) to a point where a second injection of gaseous $NH_3$ is undertaken at lower temperature levels.

Even if the gaseous $NH_3$ is injected at only one location, the quantity will always be such as to react initialy with the existing $SO_3$ and further on at lower temperatures with the $SO_2$.

The combustion gases, after the last $NH_3$ injection, are sent along the duct (5) and into an appropriately dimensioned duct (6). This duct (6) has a battery of atomizing nozzles (6a) in adequate number and sizing.

These nozzles spray a recirculating solution of Ammonium Sulphate into the combustion gases. This solution is recirculated under pressure by a pump and piping (7).

A water make-up system (7a) is hooked up into this r recirculating system. This pre-washing phase insures initial absorption of the existing $(NH_4)_2SO_4$ particles and a severe temperature drop of the combustion gases. Depending on the inlet temperature of the gases to this pre-washer/absorber, the completion of the $SO_2$ reaction to $(NH_4)_2SO_4$, may also happen in this region.

In the second stage of the $(NH_4)_2SO_4$ (Ammonium Sulphate) absorption in water, the combustion gases pass through a high pressure injector (8a) (or additional nozzles) spraying $(NH_4)_2SO_4$ solution into the gaseous stream, which is assembled on top of a solution collection tank (8). At this phase the simultaneous retention of the soluble Ammonium Sulphate particles and of the insoluble particles such as carbon, inorganic materials, etc, is achieved.

The concentrated solution of Ammonium Sulphate may be continuously or periodicaly taken away from the collection tank (8) into a storage tank (9).

This volume is substituted by make-up water. One of the advantages of this wet separation process is that the insoluble and undesirable particles can be easily separated from the dissolved Ammonium Sulphate solution by conventional filters or gravity settling.

The system has also foreseen, for the cases where water entrained as mist should not be lost, the installation of a low pressure drop demister (10) which recovers part of the water which is returned to the solution tank (8) by piping (11).

The combustion gases leave the solution tank (8) totaly desulphurized or, if desired, within the $SO_2$ emission levels specified by the local Environmental Control Agency. The emission level is easily adjusted by the variation of the Ammonia flow to be injected, with the use of proportioning or manual valves and flowmeters.

The complete system can also receive a pH controller of the tank (8) solution to insure continuous neutralization of the $SO_2$.

Direct or indirect measurement systems of the Ammonium Sulphate concentration in the solution contained in the tank (8) can also be added.

The duct (5) which receives the combustion gases, can also remain connected to the existing chimney (12) through a normaly closed gate valve which functions as a by-pass to the separation system.

Figure 2:
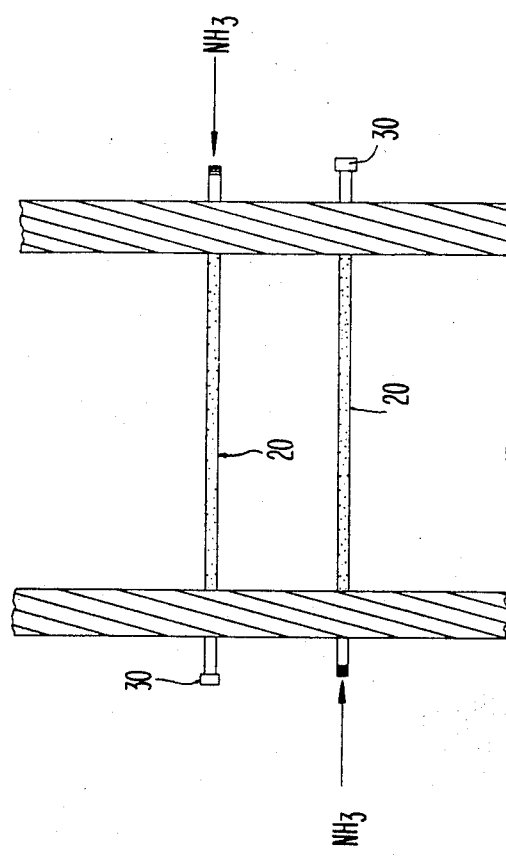
Figure 3:
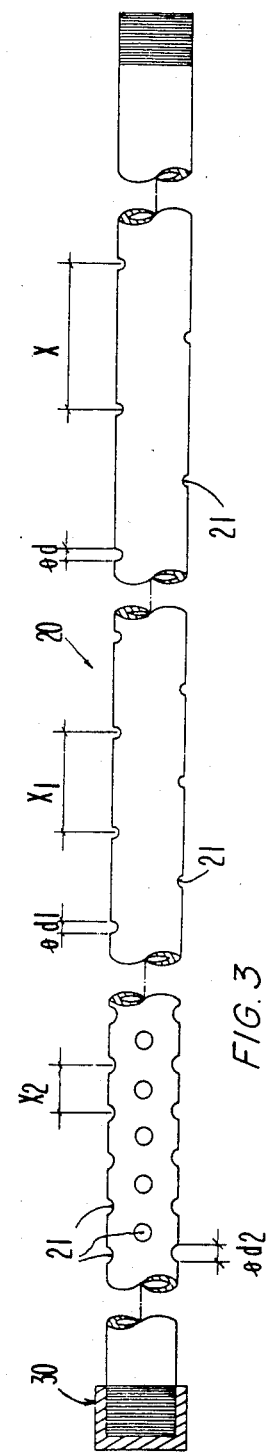

As shown in FIGS. 2 and 3, the Ammonia gas injection is made in the gas ducts through perfurated tubes (20), the number and disposition of the tubes being determined by the calculated Ammonia gas flow, and by the objective of obtaining complete intermixing with the combustion gases.

The tubes are preferentialy built out of mild steel and completely cross the combustion gas ducts, each tube being divided in three equal parts, with different number and sizes of holes (21), as better detailed in FIG. 3. The first part has two series of holes (21) with a diameter d and a spacing of x. The second part has two lines of $d_1$ diameter holes, where $d_1$ is larger than d and spaced in an interval $x_1$, smaller than x. Likewise the third part has $d_2$ diameter holes ($d_2$ larger than $d_1$) spaced at $x_2$ intervals smaller than $x_1$.

The usual installation requires two parallel tubes (FIG. 2). In this case, the $NH_3$ gas will enter one tube from the right end of the duct while the other tube enters from the left.

The $NH_3$ gas always enters the tube going through the d diameter, x spaced holes (21).

A plug (30) blocks the end of each tube. The two series of holes of each tube (FIG. 3) are located so that a hole of one series is always in between two holes of the other series.

We claim:

1. A process for eliminating air pollutants in the form of sulfur dioxide and sulfur trioxide resulting from the combustion of sulphur bearing fuels and for producing a liquid consisting essentially of ammonium sulphate as a useful commercial end-product, which comprises the following steps:

providing at least one injection of Ammonia into combustion gases which are at a temperature of 250° C. to 600° C., the Ammonia being injected in sufficient quantity to transform, into Ammonium Sulphate, substantially all the existing $SO_3$ and $SO_2$ produced by the combustion of these fuels, a portion of the injected Ammonia reacting with substantially all of said $SO_3$ to produce Ammonium Sulphate, the remainder of said Ammonia intermixing with said combustion gases;

cooling the combustion gases having intermixed Ammonia to a temperature lower than 65° C. in the presence of air, whereby at least a portion of the remaining Ammonia reacts with substantially all of said $SO_2$ to produce ammonium sulfite which is simultaneously oxidized to produce Ammonium Sulphate;

passing these gases through a separation system adequate for submicron to low value micra particulates;

collecting the Ammonium Sulphate end-product from the separation system; and releasing the desulphurized gases to the atmosphere.

2. A process as claimed in claim 1, characterized in that the Ammonia injection is made with the combustion gases at a temperature range of about 250° C. to 400° C.

3. A process for eliminating air pollutants in the form of sulfur dioxide and sulfur trioxide resulting from the combustion of sulphur bearing fuels and for producing a liquid consisting essentially of ammonium sulphate as a useful commercial end-product, which comprises the following steps:

providing a first injection of Ammonia into the combustion gases when these are at a 250° C. to 600° C. temperature range and in sufficient quantity to react with all $SO_3$, formed by the combustion of these fuels;

providing a second injection of Ammonia into the combustion gases when these are at a 65° C. to 250° C. temperature range, and in a sufficient quantity to react with at least a sufficient part of the $SO_2$, so that the $SO_2$ remaining is within the local limits for emission of $SO_2$, as established by the Environmental Authorities;

cooling the combustion gases to a temperature lower than 65° C. in the presence of air, whereby at least a portion of the remaining Ammonia reacts with substantially all of said $SO_2$ to produce ammonium sulfite which is simultaneously oxidized to produce Ammonium Sulphate;

passing these gases through a separation system adequate for submicron to low value micra particulates;

collecting the Ammonium Sulphate end-product from the separation system; and releasing the desulphurized gases to the atmosphere.

4. A process as claimed in claim 3, characterized in that the first injection of Ammonia is made with the combustion gases when they are at a temperature range of 300° C. to 400° C. and second injection of Ammonia with the gases at 65° C. to 120° C. range.

5. A process as claimed in any one of the claims 1 or 2, characterized in that the separation means include absorbers with water, with the resulting Ammonium Sulphate Solution being separated from the desulphurized combustion gases.

6. A process as claimed in claim 5, characterized in that the cooling of the combustion gases to temperatures under 65° C. is also completed in the separation system.

7. A process as claimed in any one of the claims 1 to 4, characterized in that the Ammonia is injected in gaseous state.

8. A process as claimed in claim 7, characterized in that the injection of Ammonia gas is made by means of perforated tubes installed transversely to the combustion gases' stream.

* * * * *